(12) United States Patent
Wang

(10) Patent No.: US 12,525,878 B2
(45) Date of Patent: Jan. 13, 2026

(54) SHARED PUMP STRUCTURE THAT CAN DYNAMICALLY ADJUST ITS PHASE RATIO AND CONTROL METHOD THEREOF

(71) Applicant: NOVATEK Microelectronics Corp., Hsin-Chu (TW)

(72) Inventor: Chia-Wei Wang, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 29 days.

(21) Appl. No.: 18/736,527

(22) Filed: Jun. 6, 2024

(65) Prior Publication Data
US 2025/0379517 A1   Dec. 11, 2025

(51) Int. Cl.
*H02M 3/07*   (2006.01)
*G11C 5/14*   (2006.01)

(52) U.S. Cl.
CPC ............... *H02M 3/07* (2013.01); *G11C 5/145* (2013.01)

(58) Field of Classification Search
CPC ........ H02M 3/07; H02M 3/071; H02M 3/073; H02M 3/072; G11C 5/145; G11C 5/146; G11C 5/148
See application file for complete search history.

(56) References Cited

U.S. PATENT DOCUMENTS

2020/0382002 A1\* 12/2020 Philip .................. H02M 1/088
2021/0203329 A1   7/2021 Finocchiaro

FOREIGN PATENT DOCUMENTS

| CN | 105680675 A | 6/2016 |
| CN | 114448229 A | 5/2022 |
| JP | 2015-164386 A | 9/2015 |
| TW | 202241031 A | 10/2022 |

\* cited by examiner

*Primary Examiner* — Jung Kim
(74) *Attorney, Agent, or Firm* — Winston Hsu

(57) ABSTRACT

A shared charge pump partly disposed on an integrated circuit provides a first output voltage and a second output voltage to a coupled device, and includes: a plurality of switches coupled to a first input voltage and a second voltage, wherein the switches are individually opened and closed according to control logic; and a capacitor disposed outside the IC for storing charge according to the first input voltage and the second input voltage during a first phase, discharging to generate the first output voltage during a second phase, and discharging to generate the second output voltage during a third phase. The shared charge pump enters the first phase, the second phase and the third phase via control of the plurality of switches, and a sequence of the phases can be dynamically switched according to a level of the first output voltage and the second output voltage determined at the capacitor.

26 Claims, 14 Drawing Sheets

SHARED PUMP STRUCTURE THAT CAN DYNAMICALLY ADJUST ITS PHASE RATIO AND CONTROL METHOD THEREOF

BACKGROUND OF THE INVENTION

1. Field of the Invention

The present invention is directed to charge pumps, and more specifically, to a shared charge pump structure which uses dynamic phase switching via a clamping function.

2. Description of the Prior Art

As is well-known, charge pumps are a common device for generating specific driving voltages required by a coupled device. Charge pumps use components such as capacitors and resistors to store charge received via at least an input voltage, and the stored charge is then output as an output voltage. Single charge pumps typically receive two input voltages $V_{IN1}$ and $V_{IN2}$ and generate an output $V_{OUT}$ for supplying a coupled device with the specific driving voltage.

Charge pumps alternate between charging and pumping phases, wherein a charging phase receives input voltages and stores charge in capacitors therein, and a pumping phase discharges the capacitors to generate an output voltage. Through alternatively charging and discharging capacitors, the charge pump can increase or decrease a given input voltage to the desired level. Charge pumps are therefore widely applied in electronic circuits such as LED drivers.

SUMMARY OF THE INVENTION

The present invention provides a shared charge pump and method for operating the same, wherein pumping and charging phases of the shared charge pump can be switched dynamically according to specific needs. The disclosed shared charge pump and method can be particularly applied to a vehicle having an automotive panel which requires specific gate high and gate low voltages for driving the panel, but can also be applied to any circuit or device which requires fast switching and charging.

A shared charge pump partly disposed on an integrated circuit according to an exemplary embodiment of the present invention provides a first output voltage and a second output voltage to a coupled device, and comprises: a plurality of switches coupled to a first input voltage and a second voltage, wherein the switches are individually opened and closed according to control logic; and a capacitor disposed outside the IC for storing charge according to the first input voltage and the second input voltage during a first phase, discharging to generate the first output voltage during a second phase, and discharging to generate the second output voltage during a third phase. The shared charge pump enters the first phase, the second phase and the third phase via control of the plurality of switches, and a sequence of the phases can be dynamically switched according to a level of the first output voltage and the second output voltage determined at the capacitor.

The dynamic switching occurs by comparing a level of the first output voltage with a first threshold and comparing a level of the second output voltage with a second threshold, wherein the first threshold corresponds to a required voltage gate high value of an external coupled device, and the second threshold corresponds to a required voltage gate low value of the external coupled device. Priority of the first output voltage and the second output voltage is determined according to whether a difference between the first output voltage and the first threshold is greater or less than a difference between the second output voltage and the second threshold, wherein when a difference between the first output voltage and the first threshold is greater than a difference between the second output voltage and the second threshold, the second output voltage has priority, and when a difference between the first output voltage and the first threshold is less than a difference between the second output voltage and the second threshold, the first output voltage has priority.

For a first set number of consecutive clock cycles within a predetermined number of consecutive clock cycles, the shared charge pump enters the first phase. After the first set number of consecutive clock cycles, the shared charge pump compares the level of the first output voltage with the first threshold and the level of the second output voltage with the second threshold. When the first output voltage has priority, the shared charge pump uses the comparison between the first output voltage and the first threshold level to determine if the level of the first output voltage is sufficient, and when the second output voltage has priority, the shared charge pump uses the comparison between the second output voltage and the second threshold level to determine if the level of the second output voltage is sufficient. When the first output voltage is sufficient, the shared charge pump enters the second phase for a second set number of consecutive clock cycles and then re-enters the first phase for the first set number of consecutive clock cycles, and when the first output voltage is not sufficient, the shared charge pump enters the second phase for a third set number of consecutive clock cycles being twice the second set number of consecutive clock cycles. When the second output voltage is sufficient, the shared charge pump enters the third phase for a second set number of consecutive clock cycles and then re-enters the first phase for the first set number of consecutive clock cycles, and when the second output voltage is not sufficient, the shared charge pump enters the third phase for a third set number of consecutive clock cycles being twice the second set number of consecutive clock cycles.

The shared charge pump further utilizes a mapping table to plot a temperature of the shared charge pump with a level of the first output voltage and a level of the second output voltage, wherein the level of the first output voltage and a level of the second output voltage determined at the capacitor are further calibrated by inputting a current temperature of the shared charge pump to the mapping table.

The present invention further provides a method for generating a first output voltage and a second output voltage using a shared charge pump partly disposed on an integrated circuit (IC) and providing the first output voltage and the second output voltage to an external coupled device according to an exemplary embodiment. The method comprises: coupling a plurality of switches to a first input voltage and a second voltage; using control logic for individually opening and closing the plurality of switches; storing charge on a capacitor disposed outside the IC according to the first input voltage and the second input voltage during a first phase entered via the control logic; discharging the capacitor to generate the first output voltage during a second phase entered via the control logic; and discharging the capacitor to generate the second output voltage during a third phase entered via the control logic. A sequence of the phases can be dynamically switched, and comprises: determining a level of the first output voltage and a level of the second output voltage at the capacitor.

The step of determining a level of the first output voltage and a level of the second output voltage at the capacitor comprises: comparing a level of the first output voltage with a first threshold and a level; and comparing a level of the second output voltage is compared with a second threshold. The first threshold corresponds to a required voltage gate high value of the external coupled device, and the second threshold corresponds to a required voltage gate low value of the external coupled device.

The method further comprises: determining a priority of the first output voltage and the second output voltage according to whether a difference between the first output voltage and the first threshold is greater or less than a difference between the second output voltage and the second threshold; wherein when a difference between the first output voltage and the first threshold is greater than a difference between the second output voltage and the second threshold, the second output voltage has priority, and when a difference between the first output voltage and the first threshold is less than a difference between the second output voltage and the second threshold, the first output voltage has priority.

The step of storing charge on a capacitor disposed outside the IC according to the first input voltage and the second input voltage during a first phase entered via the control logic is performed for a first set number of consecutive clock cycles within a predetermined number of consecutive clock cycles. The step of comparing the level of the first output voltage with the first threshold and the level of the second output voltage with the second threshold is performed after the first set number of consecutive clock cycles.

When the first output voltage has priority, the method further comprises: utilizing the comparison between the first output voltage and the first threshold level to determine if the level of the first output voltage is sufficient; and when the second output voltage has priority, the method further comprises: utilizing the comparison between the second output voltage and the second threshold level to determine if the level of the second output voltage is sufficient. When the first output voltage is sufficient, the method comprises: entering the second phase for a second set number of consecutive clock cycles; and re-entering the first phase for the first set number of consecutive clock cycles. When the first output voltage is not sufficient, the method comprises entering the second phase for a third set number of consecutive clock cycles being twice the second set number of consecutive clock cycles. When the second output voltage is sufficient, the method comprises: entering the third phase for a second set number of consecutive clock cycles; and re-entering the first phase for the first set number of consecutive clock cycles. When the second output voltage is not sufficient, the method comprises entering the third phase for a third set number of consecutive clock cycles being twice the second set number of consecutive clock cycles.

The method further comprises: generating a mapping table comprising a temperature of the shared charge pump, a level of the first output voltage and a level of the second output voltage; and the step of determining a level of the first output voltage and a level of the second output voltage at the capacitor comprises: inputting a current temperature of the shared charge pump to the mapping table to calibrate the first output voltage and the second output voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
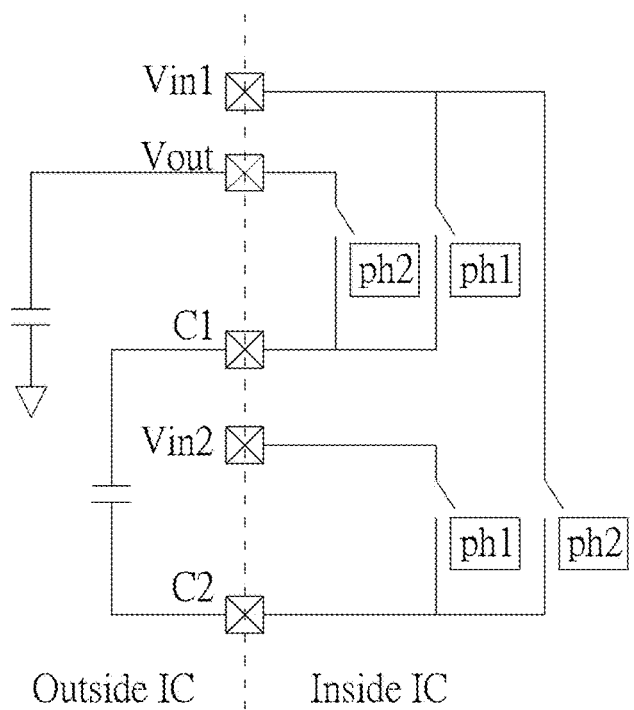
FIG. 1A is a schematic diagram of a single charge pump.

Refer to FIG. 1A, which is a schematic diagram of a single charge pump 100. The charge pump operates in two phases, PH1 and PH2, wherein the phases are controlled by the opening and closing of switches. PH1 is a charging phase where the input voltages are received via said switch control to generate a stored charge, and PH2 is a pumping phase where the capacitors discharge via said switch control to generate the output voltage $V_{OUT}$.

Figure 1B:
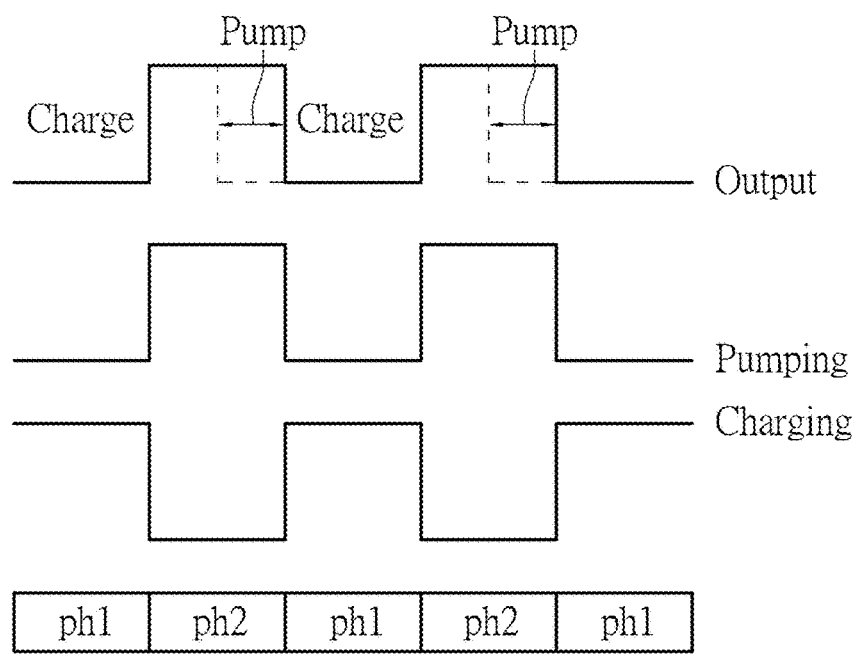
FIG. 1B is a diagram of charging and pumping phases of the single charge pump shown in FIG. 1A.

FIG. 1B illustrates a timing of the charging and pumping phases. As the single charge pump 100 only generates a single output voltage $V_{OUT}$, the charging and pumping phases thereof alternate between the charging phase PH1 and the pumping phase PH2, such that 50% of the time is spent on charging and 50% of the time is spent on pumping.

Figure 1C:
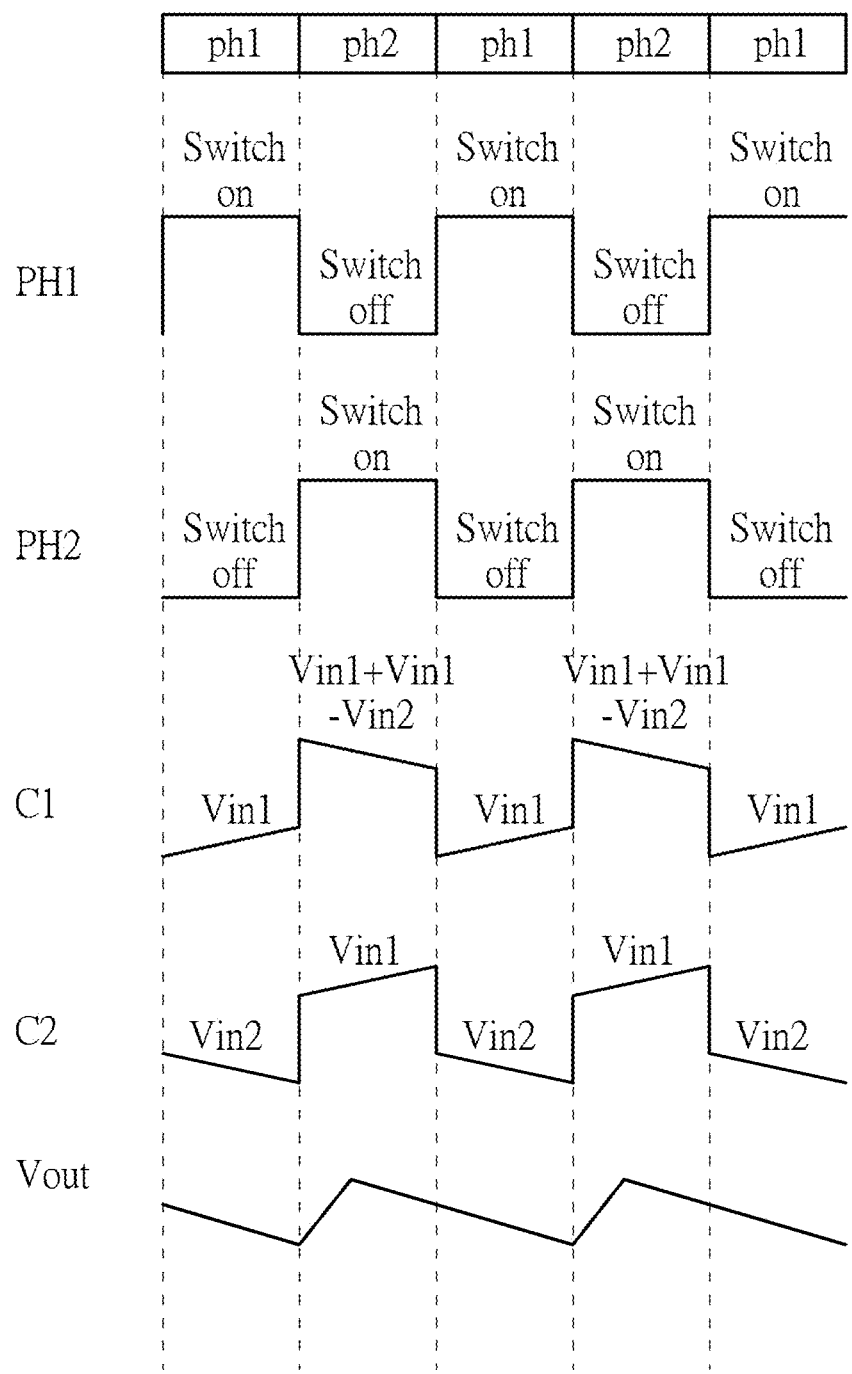
FIG. 1C is a diagram of signals of the charge pump shown in FIG. 1A.

FIG. 1C illustrates the signals of the charge pump 100 during the charging phases PH1 and pumping phases PH2. The charging phase is controlled by turning on switches PH1 and turning off switches PH2, and the opposite happens in the pumping phase. As shown in the diagram, $V_{OUT}$ will fall during the charging phase, peak during the pumping phase, and then start to fall again until a next pumping phase is entered. Although the single charge pump operates in a charging phase for 50% of the operational time which is efficient, the single charge pump can only provide a single output voltage. A coupled device such as an automotive panel may require differential driving voltages, which can be described as a gate high voltage VGH and a gate low voltage VGL, which cannot be supplied by the single charge pump.

Figure 2A:
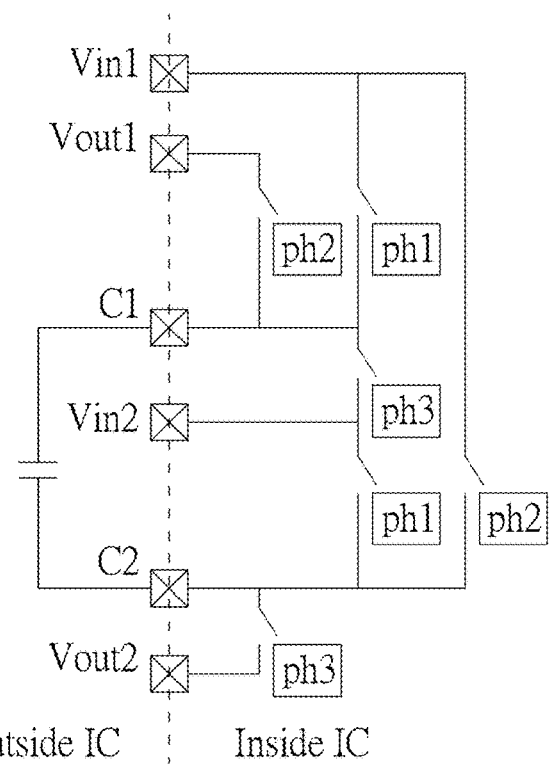
FIG. 2A is a schematic diagram of a shared charge pump.

Refer to FIG. 2A, which is a schematic diagram of a shared charge pump 200. Compared with the single charge pump 100 shown in FIG. 1A, the shared charge pump 200 generates two output voltages, VOUT1 and VOUT2, as well as receiving two input voltages VIN1 and VIN2. Generation of the second output voltage requires more switches for controlling a third operational phase PH3, which is when the second output voltage VOU2 is output.

Figure 2B:
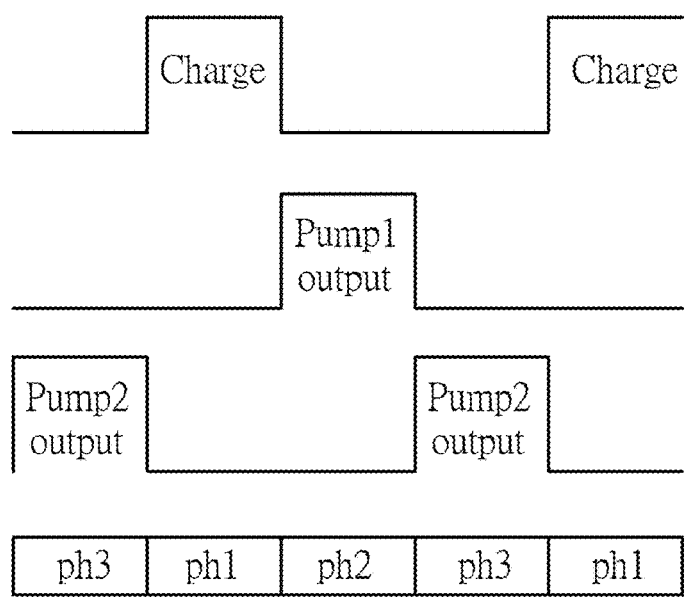
FIG. 2B is a diagram of charging and pumping phases of the shared charge pump shown in FIG. 2A.

FIG. 2B illustrates the charging and pumping phases of the shared charge pump 200. In the shared charge pump 200, $V_{OUT1}$ will be output during phase PH2, $V_{OUT2}$ will be output during phase PH3, and charging will occur during phase PH1. The shared charge pump 200 operates in a fixed phase sequence of PH1, PH2 and PH3, wherein PH1 is a charging phase and PH2 and PH3 are pumping phases. Due to the extra output voltage, only ⅓ of the total operational time is spent on charging.

Figure 2C:
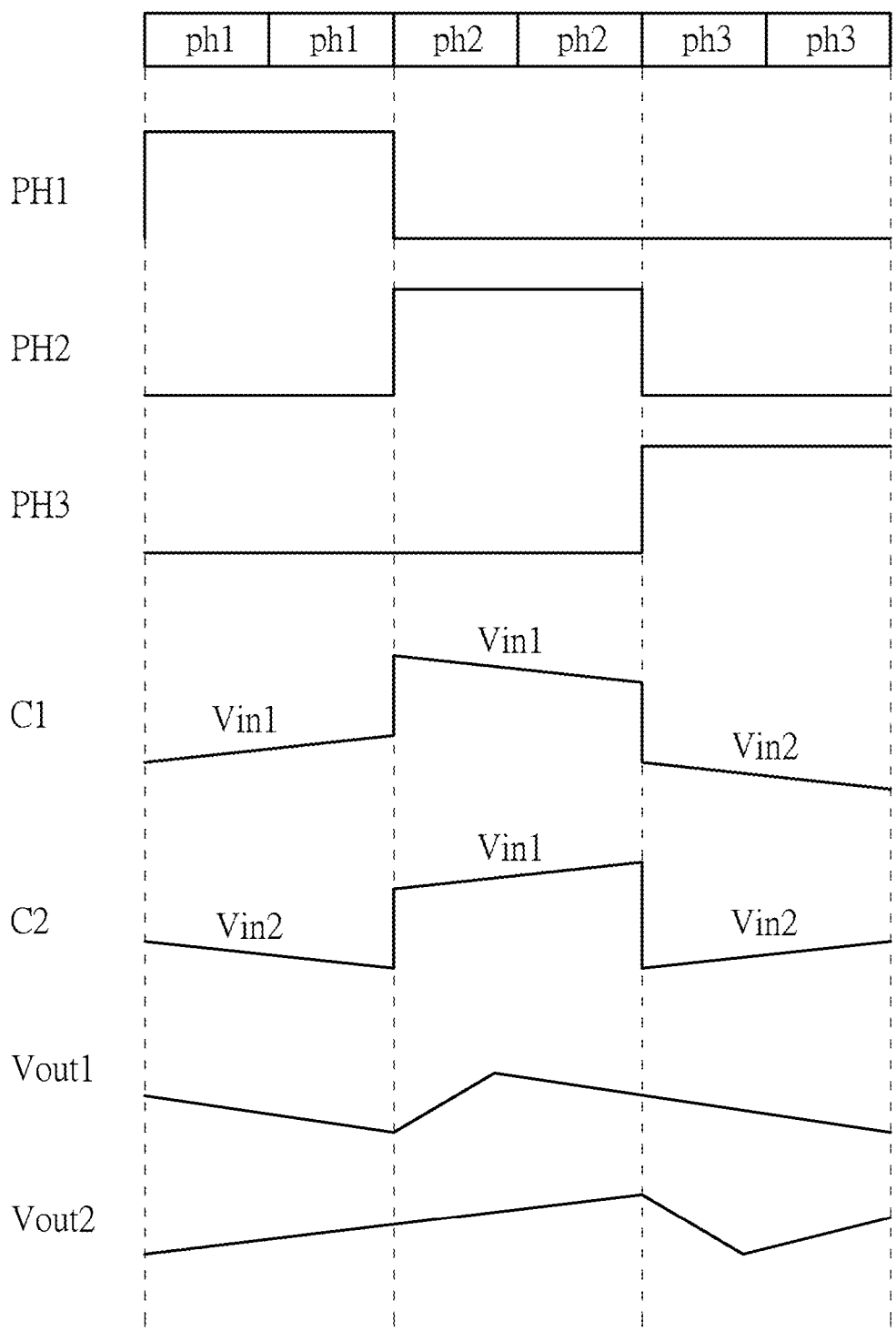
FIG. 2C is a diagram of signals of the charge pump shown in FIG. 2A.

The signals of the shared charge pump 200 during the charging and pumping phases are shown in FIG. 2C. As shown in the diagram, $V_{OUT1}$ peaks during phase PH2 and falls, but more steadily as compared to the output voltage of the single charge pump. In addition, $V_{OUT2}$ (which is a negative voltage) will peak during PH3, fall back down, and then continue to fall steadily during phase PH1 and PH2.

Although the shared charge pump 200 illustrated in FIG. 2A provides more stable output voltages, both charge pumps need to be charged during PH1. Further, there is only a single charging phase compared to two pumping phases, which means the shared charge pump has to wait longer to enter a next charging phase as compared to the single charge pump. In addition, the shared charge pump 200 operates in a fixed sequence, such that each output voltage can only be supplied when its corresponding pumping phase is reached. If the switching frequency is high, the stored charge may be insufficient, whereas if the switching frequency is lowered such that sufficient charge can be stored, the system must wait longer for a particular desired voltage to be output. $V_{OUT1}$ and $V_{OUT2}$ may be of different values, but the shared charge pump allocates the same output time to each output voltage. Furthermore, the shared charge pump 200 illustrated in FIG. 2A occupies almost double the circuit area as compared to the single charge pump 100 illustrated in FIG. 1A, due to the resistances of the switches.

This in mind, the objective of the present invention is to provide a shared charge pump structure wherein each charge pump has a particular timing ratio according to its needs. Further, dynamic switching between phases is enabled such that a particular output voltage can be output as needed. The system can select the charge pump having a threshold closer to the current amount so the charging time is shorter, which increases the efficiency.

Figure 3A:
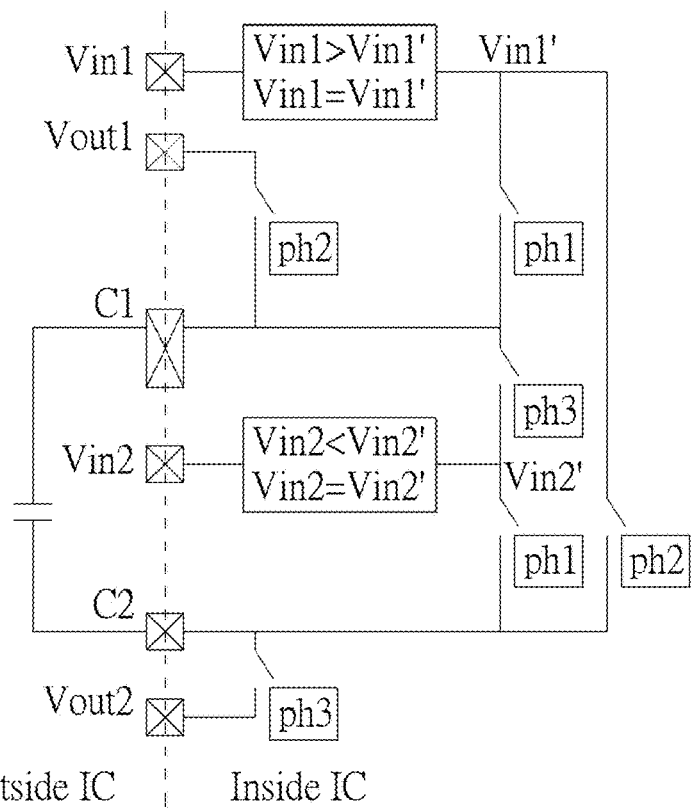
FIG. 3A is a schematic diagram of a shared charge pump according to an exemplary embodiment of the present invention.

FIG. 3A is a schematic diagram of a shared charge pump structure 300 according to an embodiment of the present invention. The shared charge pump structure comprises a first clamping circuit which receives the input voltage $V_{IN1}$ and outputs an adjustable clamped voltage $V_{IN1'}$, and a second clamping circuit which receives the input voltage $V_{IN2}$ and outputs an adjustable clamped voltage $V_{IN2'}$. The function of the clamping circuits is to make $V_{IN1'}$ equal to $V_{IN1}$ and make $V_{IN2'}$ equal to $V_{IN2}$ both during phase PH1 of the shared charge pump 300, and during the pumping phases when feedback information indicates the corresponding output voltage $V_{OUT1}/V_{OUT2}$ is insufficient. The maximum value of $V_{OUT1}$ is $V_{IN1}-V_{IN2}+V_{IN1'}$, and the maximum value of $V_{OUT2}$ is $V_{IN2}-V_{IN1}+V_{IN2'}$.

Figure 3B:
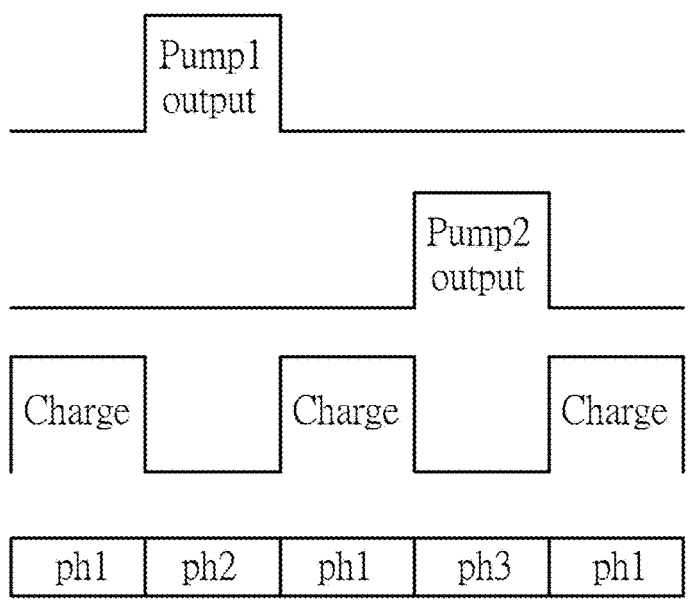
FIG. 3B is a diagram of charging and pumping phases of the shared charge pump illustrated in FIG. 3A.

Refer to FIG. 3B, which illustrates a timing diagram of the charge pump 300. The phases PH1, PH2 and PH3 do not have to follow a set sequence. In the example diagram shown in FIG. 3B, the timing sequence first enters phase PH1 for charging the charge pumps, followed by phase PH2 for outputting the first output voltage $V_{OUT1}$, and then enters phase PH1 again, followed by phase PH3 for outputting the second output voltage $V_{OUT2}$.

The order of the phases is determined according to a measurement of the output voltages $V_{OUT1}$ and $V_{OUT2}$, wherein a priority of the output voltages $V_{OUT1}$ and $V_{OUT2}$ and an amount of voltage which is required by a coupled device are determined. This means pumping and charging can be controlled according to a budget for each pump and a determination of the stored charge for each pump in comparison with the set VGL and VGH thresholds. In this way, each pump can be charged according to its needs and, due to the dynamic switching, a smaller budget can be used for a pump which has a lower threshold. This use of dynamic switching also enables the area of the shared charge pump to be reduced, as will be explained in the following.

During a charging phase (PH1) both input voltages ($V_{IN1}$ and $V_{IN2}$) are received, wherein $V_{IN1}$ is input to node C1 for and $V_{IN2}$ is input to node C2 for charging the capacitor. At the start of a first pumping phase (PH2), the input voltage $V_{IN1}$ will be input to node C2, such that the voltage at the node C2 will equal $V_{IN1}-V_{IN2}$, and the voltage at the node C1 will also increase by the same amount. This causes a rise in the output voltage $V_{OUT1}$, and $V_{OUT1}$ will be seen at node C1 such that $V_{OUT1}$ can be output during this phase. $V_{OUT1}$ will slightly decrease due to an external load drawing the current, wherein when the external load is larger, more current will be drawn and the decrease in $V_{OUT1}$ will be faster, and when there is no external load, there will be no decrease in $V_{OUT1}$.

When the charge pump 300 re-enters a charging phase PH1, the input voltage $V_{IN1}$ will again be input to node C1, and input voltage $V_{IN2}$ will again be input to node C2 such that the charge stored by the capacitor C2 is $V_{IN1}-V_{IN2}$.

At the start of a second pumping phase (PH3), C1 will be discharged by the input voltage $V_{IN2}$, such that the amount of discharged voltage will be $V_{IN1}-V_{IN2}$. $V_{OUT2}$ will start to be output at node C2. As before, there will be an external load drawing the current, but as $V_{OUT2}$ is a negative voltage, this will result in the level of $V_{OUT2}$ seen to rise at node C2 rather than decrease.

Figure 4:
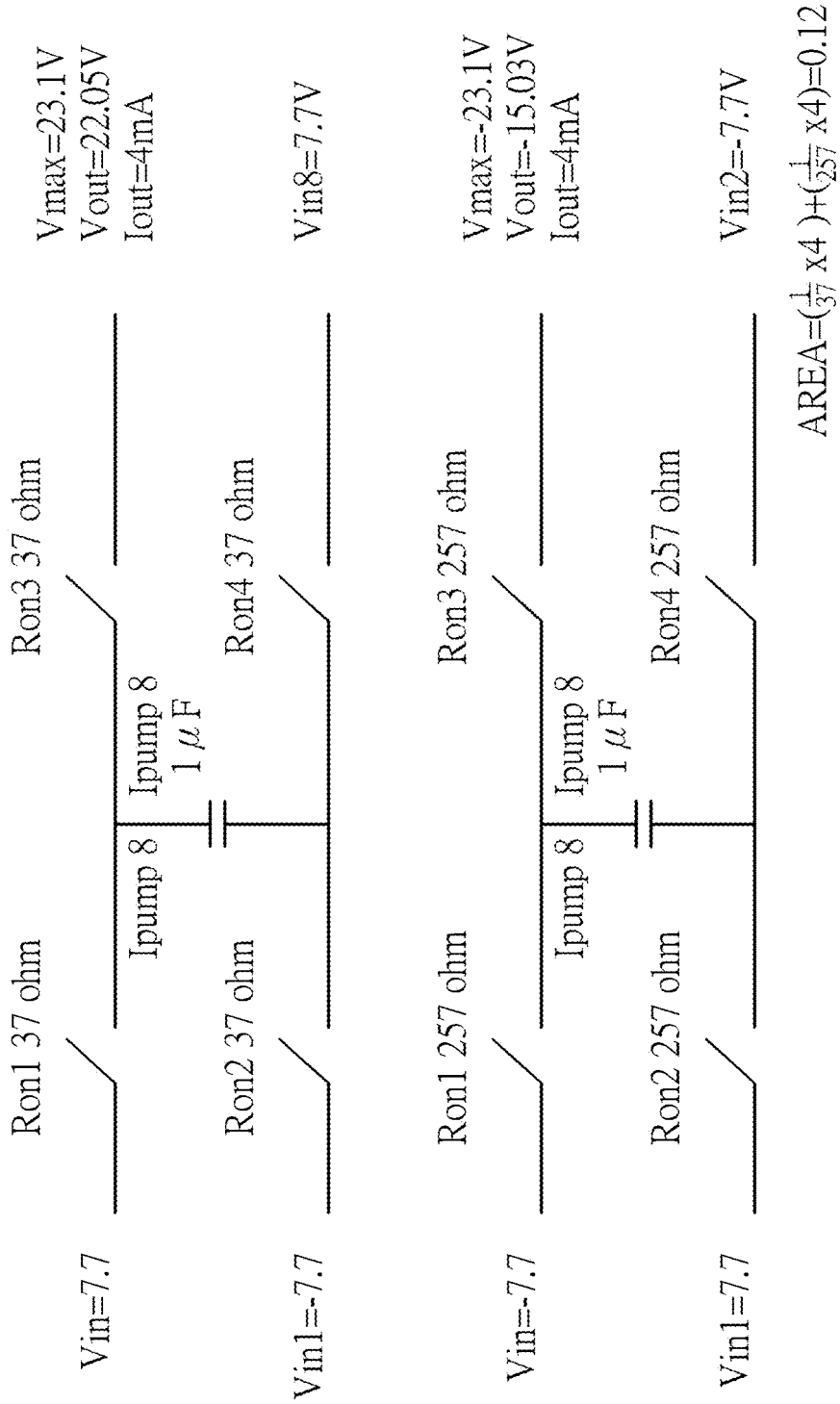
FIG. 4 is a diagram of circuit components in the single charge pump illustrated in FIG. 1A.

Refer to FIG. 4, which is a diagram of values associated with the capacitors and switches of the single charge pump 100 illustrated in FIG. 1A. As illustrated in the diagram, the resistances of the switches for operating the first capacitor are each 37 ohms, whereas the resistances of the switches for operating the second capacitor are each 257 ohms. The resistance needs to be this large to meet the worst conditions, i.e. the longest charging phase. The gate high voltage VGH is about 22V and the gate low voltage VGL is about −15V. The total area required for this circuit is (1/37×4)+(1/257×4) =0.12.

Figure 5:
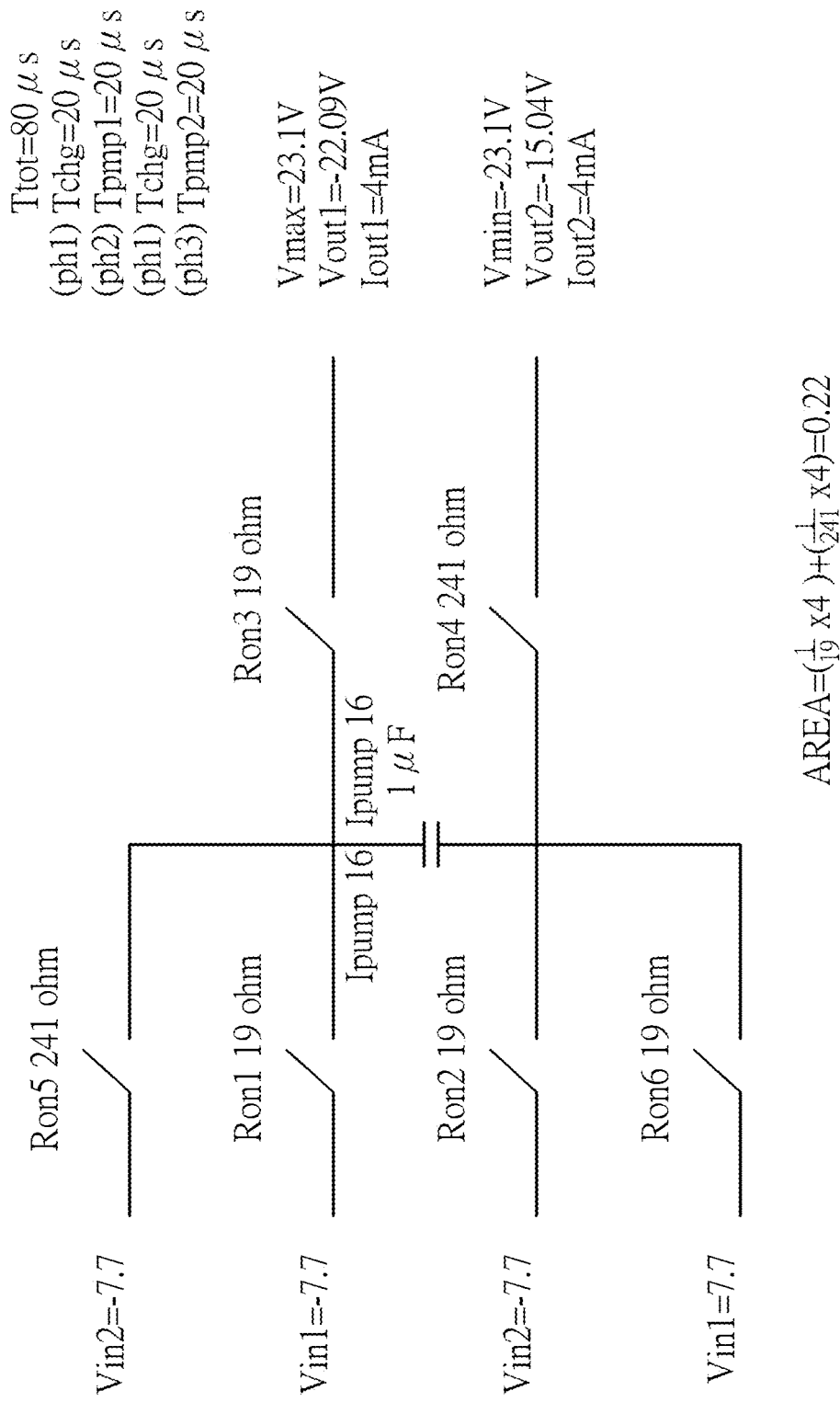
FIG. 5 is a diagram of circuit components in the shared charge pump illustrated in FIG. 2A.

Refer to FIG. 5, which is a diagram of values associated with the capacitor and switches of the shared charge pump 200 illustrated in FIG. 2A. As illustrated in the diagram, the resistances of the switches coupled between a first input node and a first output node of the capacitor are each 241 ohms, whereas the other four switches each have a resistance of 19 ohms. This lower resistance means the switch can be opened and closed faster, which enables the extra phase PH3. The gate high voltage VGH and the gate low voltage VGL are the same as in FIG. 4. The total area required for this circuit is (1/19×4)+(1/241×2)=0.22, which is almost double the size of the circuit in FIG. 4. FIG. 5 further illustrates a timing budget allocated to each of the phases, wherein each phase occupies a same amount of time.

Figure 6:
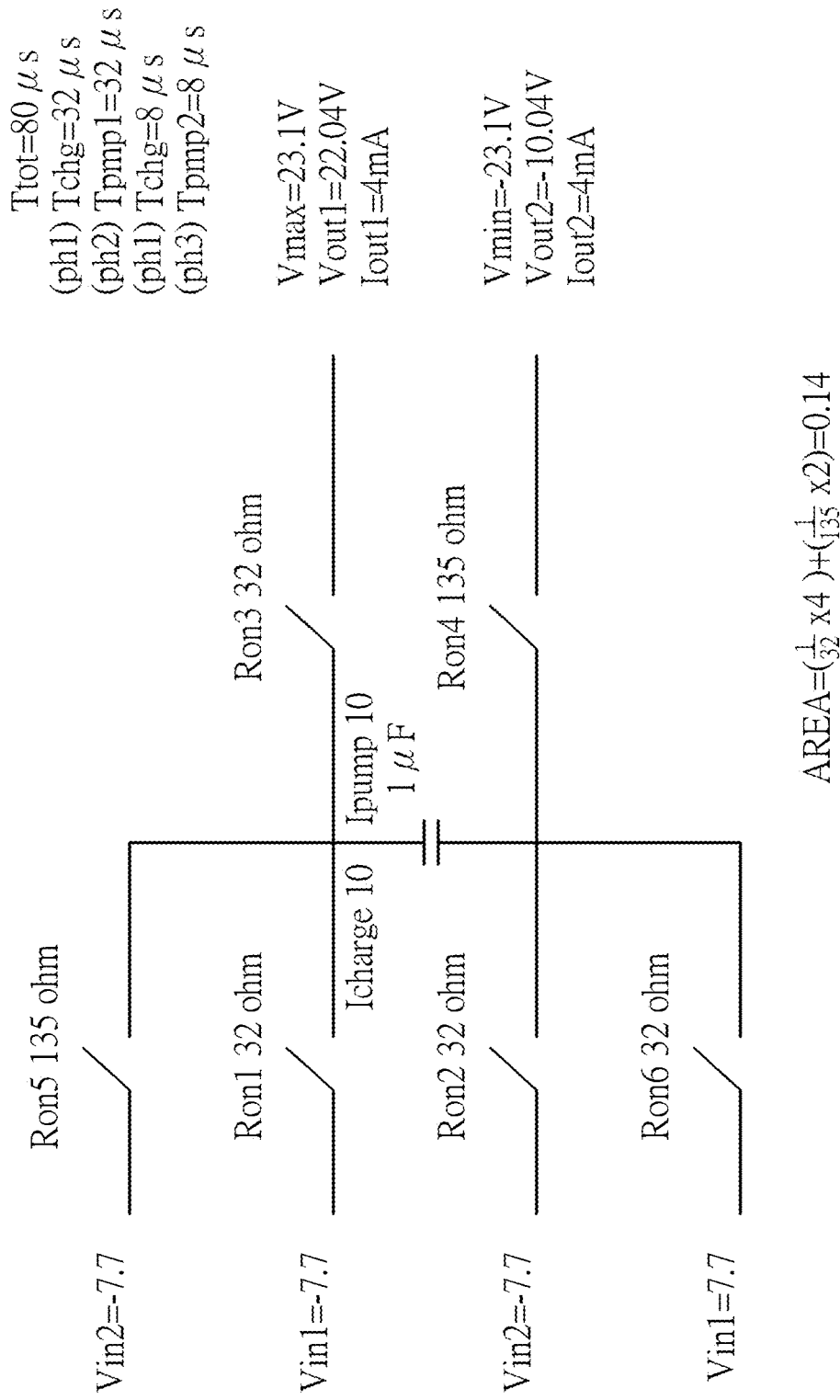
FIG. 6 is a diagram of circuit components in the shared charge pump illustrated in FIG. 3A according to a first embodiment.

Refer to FIG. 6, which is a first embodiment of the capacitor and switches of the charge pump 300 illustrated in FIG. 3A. Ron4 and Ron5 are both 135 ohms, whereas the other resistors are only 32 ohms. This is because the shared charge pump 300 of FIG. 3A can operate with four levels of output voltage, such that the difference between $V_{OUT1}$ and $V_{OUT2}$ is less than 32V. Further, timing between the phases is not evenly distributed which produces output voltages that are asymmetric about 0V, e.g. $V_{OUT2}$ may be −15V and $V_{OUT1}$ may be 15V, or $V_{OUT2}$ may be −18V and $V_{OUT1}$ may be 12V. Further, phase control can adjust the charging time for each output voltage. In the example illustrated in FIG. 6, $V_{OUT2}$ is −10V meaning that less time will be given to the charging and pumping phase for this voltage than to $V_{OUT1}$.

Figure 7:
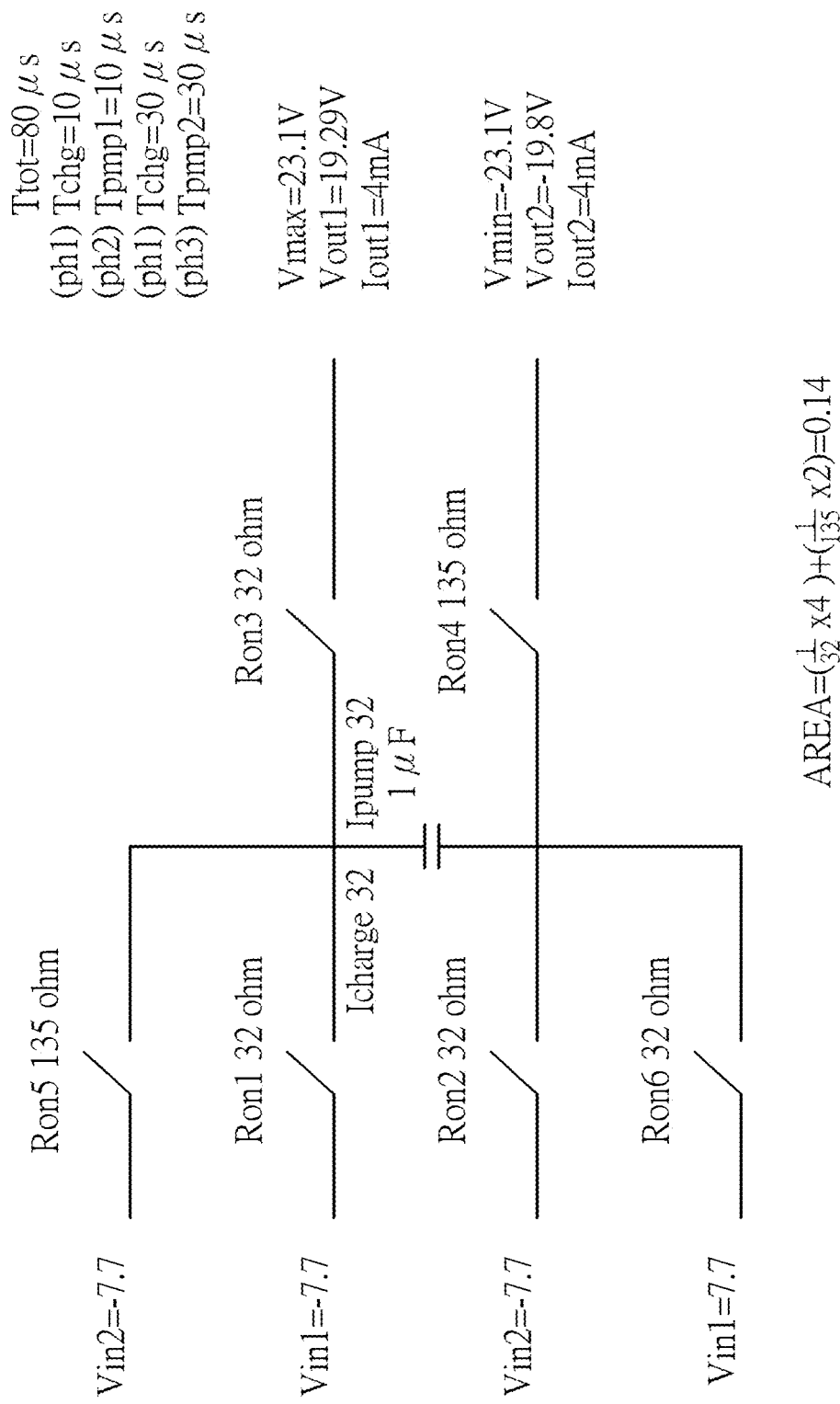
FIG. 7 is a diagram of circuit components in the shared charge pump illustrated in FIG. 3A according to a second embodiment.

FIG. 7 is a second embodiment of the capacitor and switches of the charge pump 300 illustrated in FIG. 3A, wherein $V_{OUT1}$ and $V_{OUT2}$ have different levels from those illustrated in FIG. 6 due to the adjustable phase control. The difference between $V_{OUT1}$ and $V_{OUT2}$ is still less than 32V, which means the resistance values can remain the same. In this embodiment, less time is given to charging and pumping for $V_{OUT1}$ as compared to $V_{OUT2}$.

The use of dynamic phase switching wherein less or more time can be allocated to outputting $V_{OUT1}$ or outputting $V_{OUT2}$ means that the shared charge pump 300 occupies a smaller area than the shared charge pump 200. The same principle can be applied to a system which has extra pumps, wherein each pump is selected according to its needs and a length of charging and pumping for the pump is also according to its needs.

Selection of one pump and corresponding output voltage means that the other pump should be clamped. In addition, the opening and closing of the switches can be controlled using a digital circuit or logic gates. Dynamic allocation of the charging and pumping phases offers greater flexibility.

Figure 8:
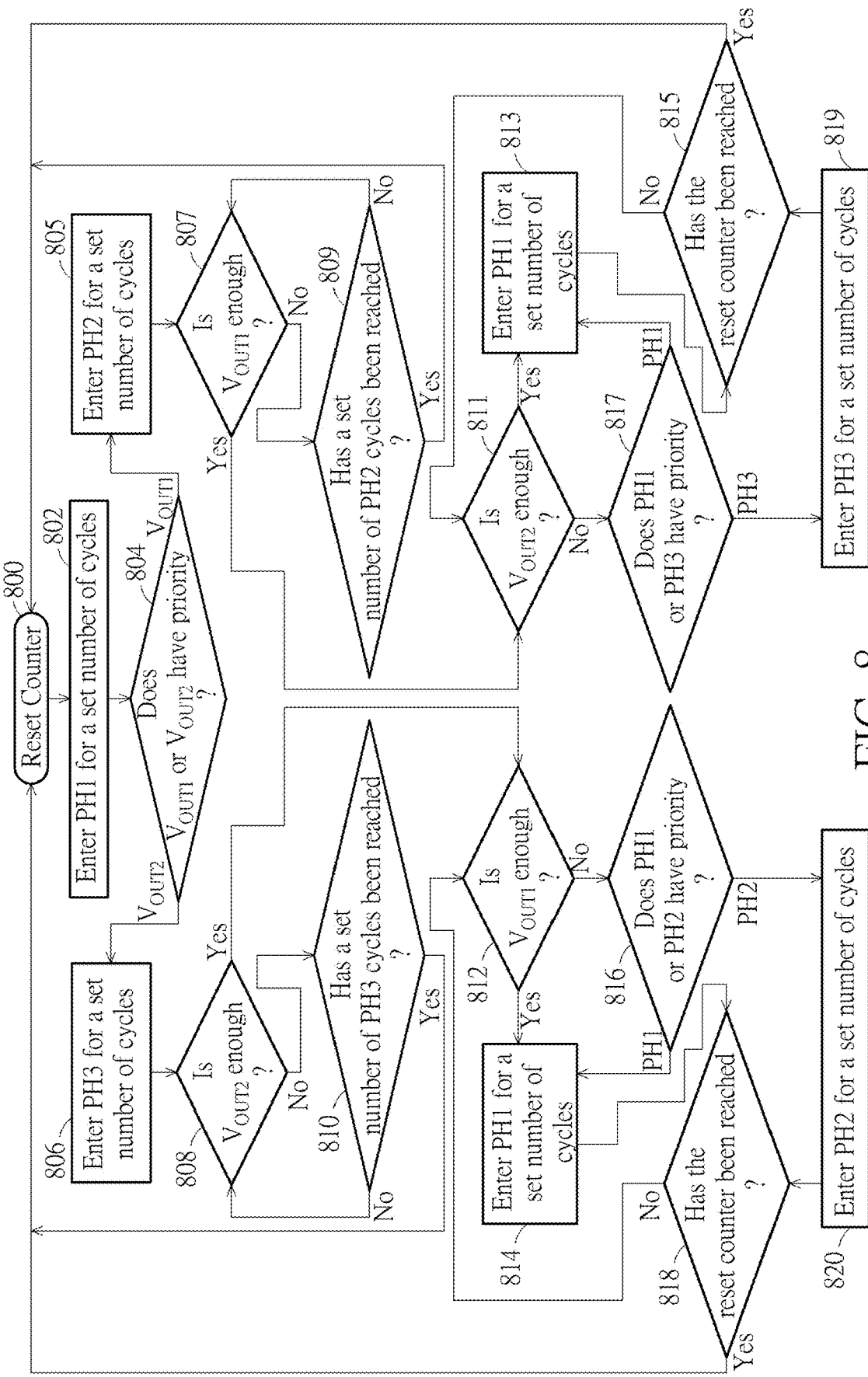
FIG. 8 is a flowchart of a method for dynamically changing an operating phase of the shared charge pump illustrated in FIG. 3A.

FIG. 8 is a flowchart which illustrates an operating flow of the invention. In this flowchart, 12 cycles are taken as an example, but the invention is not limited thereto. In the following, priority between outputting $V_{OUT1}$ and $V_{OUT2}$ is determined every 12 cycles, but this is adjustable; particularly, depending on the values of $V_{OUT1}$ and $V_{OUT2}$, the number of cycles for charging and outputting each output voltage may be different. As illustrated in FIG. 1B, PH1 is for charging, PH2 is for outputting $V_{OUT1}$ and PH3 is for outputting $V_{OUT2}$. A counter is used for counting cycles. Feedback is determined according to the external capacitor (external to the IC) in order to determine whether $V_{OUT1}$ and $V_{OUT2}$ are sufficient.

The steps of the method are detailed as follows:
Step 800: Reset Counter
Step 802: Enter PH1 for a set number of cycles
Step 804: Does $V_{OUT1}$ or $V_{OUT2}$ have priority? If $V_{OUT1}$ has priority, go to Step 805; if $V_{OUT2}$ has priority, go to Step 806
Step 805: Enter PH2 for a set number of cycles
Step 806: Enter PH3 for a set number of cycles
Step 807: Is $V_{OUT1}$ enough? If yes, go to Step 811; if no, go to Step 809
Step 808: Is $V_{OUT2}$ enough? If yes, go to Step 812; if no, go to Step 810
Step 809: Has a set number of PH2 cycles been reached? If yes, return to Step 800; if no, return to Step 807
Step 810: Has a set number of PH3 cycles been reached? If yes, return to Step 800; if no, return to Step 808
Step 811: Is $V_{OUT2}$ enough? If yes, go to Step 813; if no, go to Step 817
Step 812: Is $V_{OUT1}$ enough? If yes, go to Step 814; if no, go to Step 818
Step 813: Enter PH1 for a set number of cycles
Step 814: Enter PH1 for a set number of cycles
Step 815: Has the reset counter been reached? If yes, return to Step 800; if no, return to Step 811
Step 816: Does PH1 or PH2 have priority? If PH1 has priority, return to Step 814; if PH3 has priority, go to Step 820
Step 817: Does PH1 or PH3 have priority? If PH1 has priority, return to Step 813; if PH3 has priority, go to Step 819
Step 818: Has the reset counter been reached? If yes, return to Step 800; if no, return to Step 812
Step 819: Enter PH3 for a set number of cycles; return to Step 815
Step 820: Enter PH2 for a set number of cycles; return to Step 818

When feedback from the external capacitor determines that the output voltages are enough, the pumping phase is only entered for a set number of cycles being four cycles in an exemplary embodiment, wherein when the output voltages are not enough, the pumping phase is entered for a set number of cycles being eight cycles in an exemplary embodiment. In addition, the flow determines priority between $V_{OUT1}$ and $V_{OUT2}$ for every 12 cycles. This is merely one illustration of the method, and a different number of cycles can be used according to a designer's requirements.

Figure 9A:
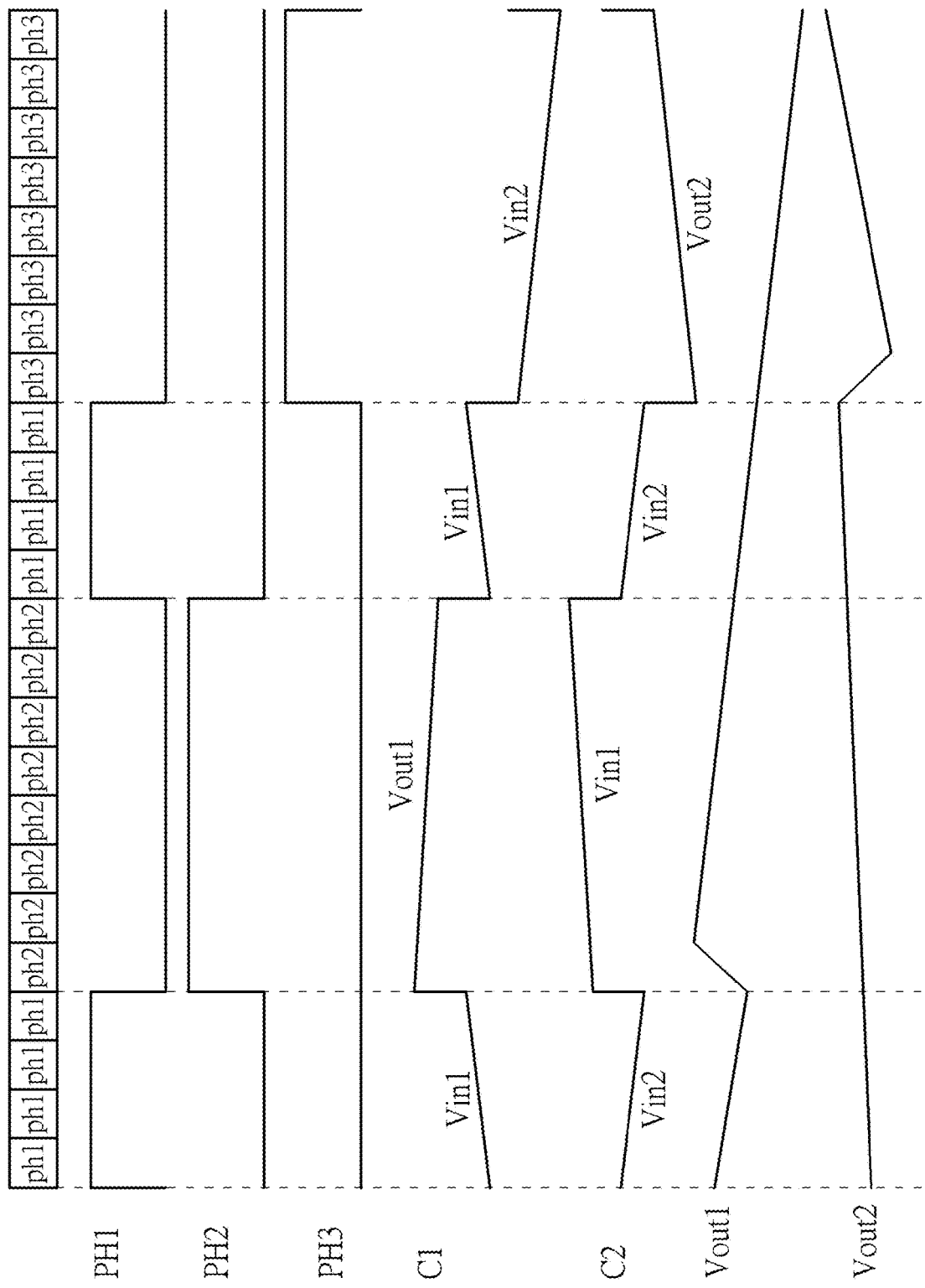
FIG. 9A is a signal diagram of the shared charge pump illustrated in FIG. 3A according to a first scenario.
Figure 9B:
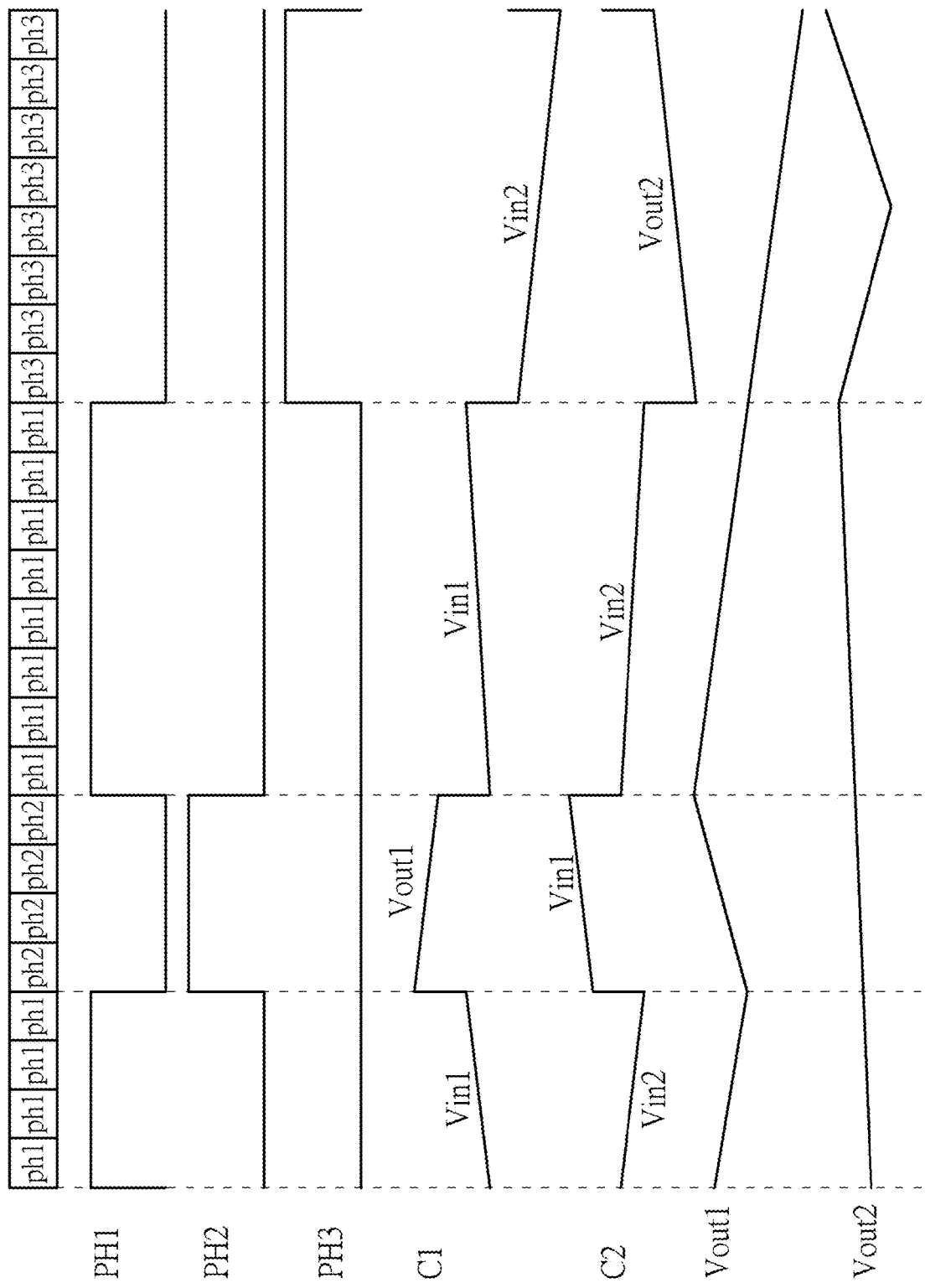
FIG. 9B is a signal diagram of the shared charge pump illustrated in FIG. 3A according to a second scenario.
Figure 9C:
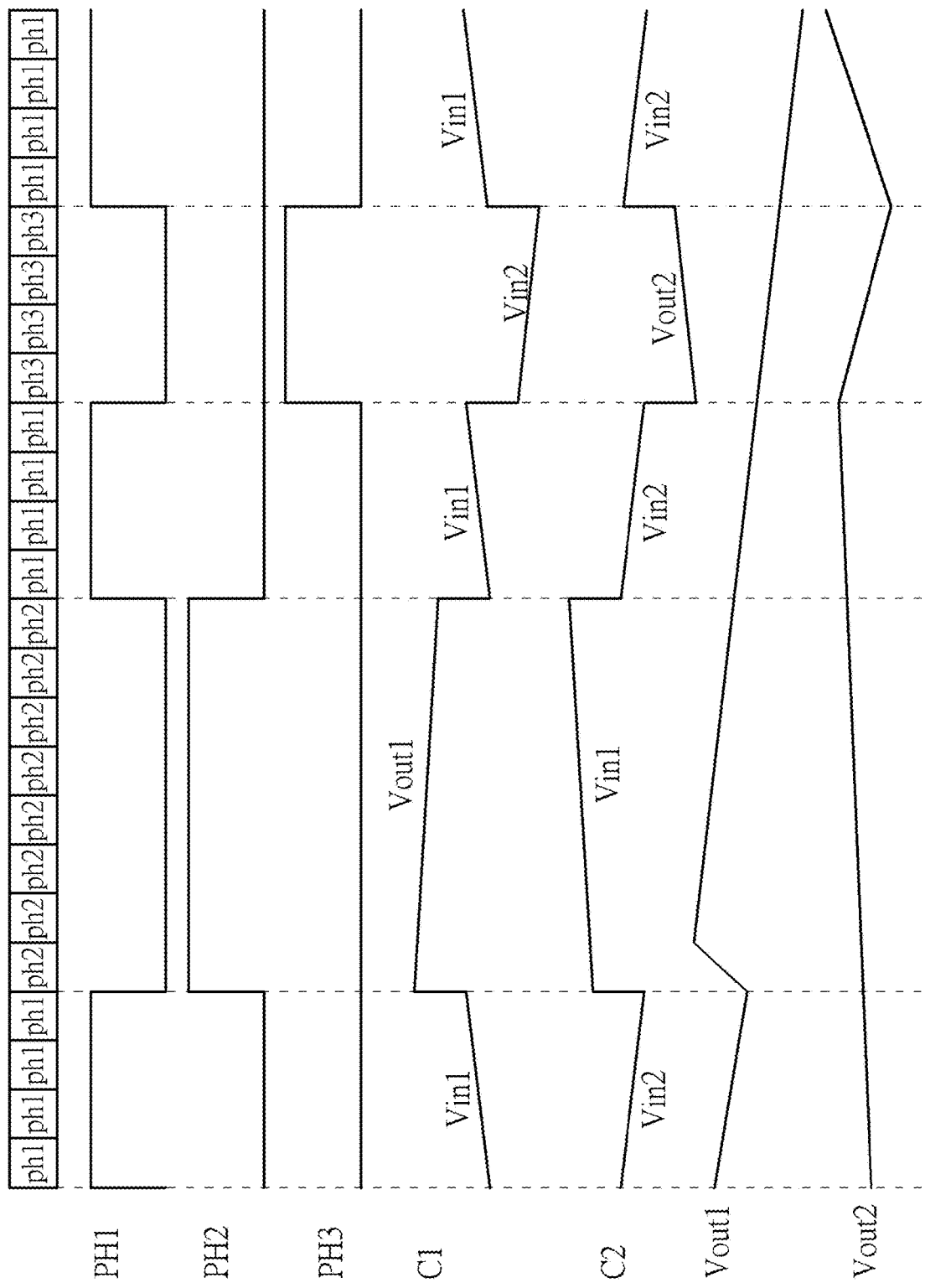
FIG. 9C is a signal diagram of the shared charge pump illustrated in FIG. 3A according to a third scenario.
Figure 9D:
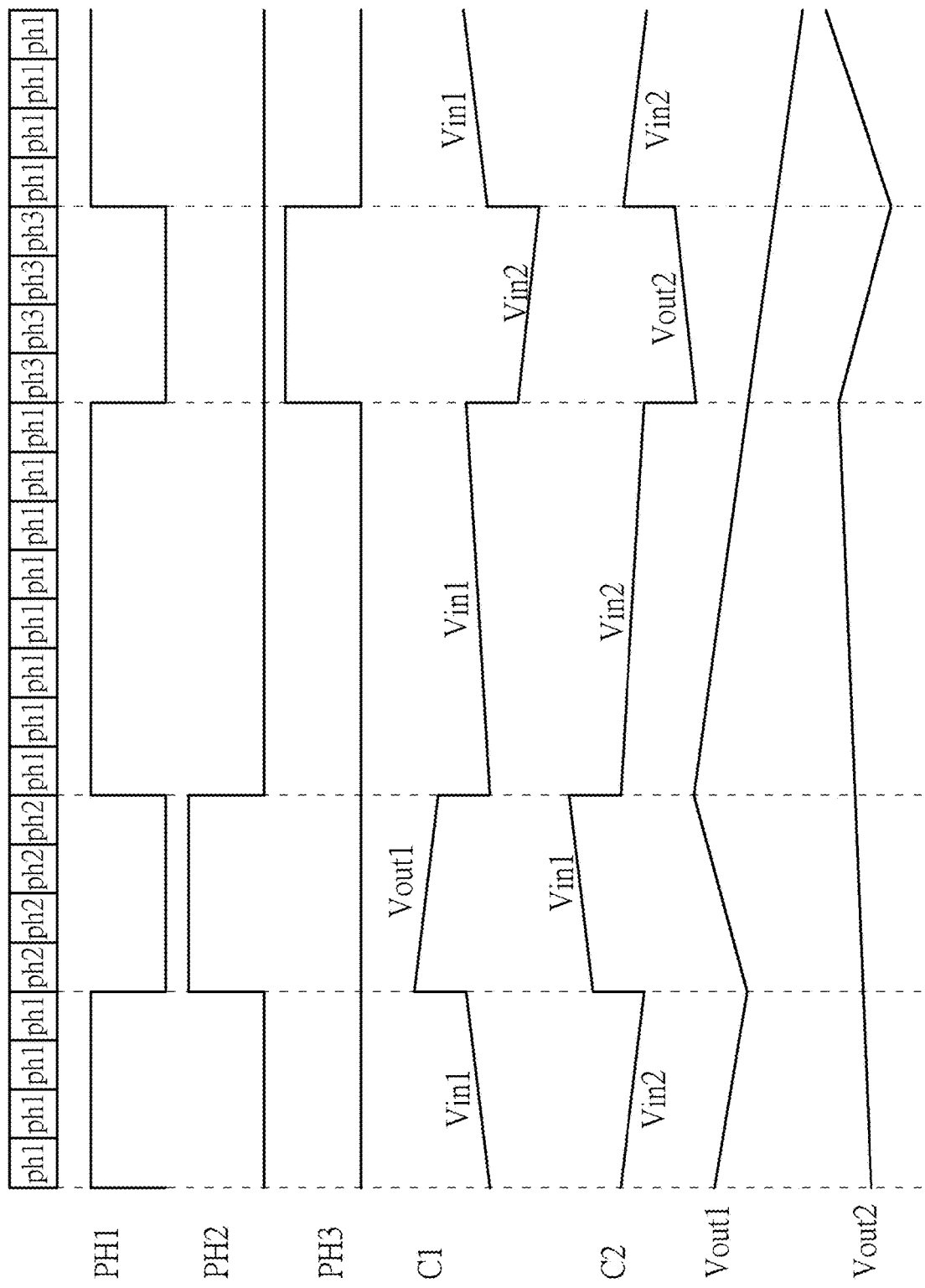
FIG. 9D is a signal diagram of the shared charge pump illustrated in FIG. 3A according to a fourth scenario.

FIGS. 9A~9D illustrate different scenarios of the shared charge pump illustrated in FIG. 3A, wherein FIG. 9A illustrates a scenario where both $V_{OUT1}$ and $V_{OUT2}$ are not enough, FIG. 9B illustrates a scenario where $V_{OUT1}$ is enough but $V_{OUT2}$ is not enough, FIG. 9C illustrates a scenario where $V_{OUT1}$ is not enough but $V_{OUT2}$ is enough, and FIG. 9D illustrates a scenario where both $V_{OUT1}$ and $V_{OUT2}$ are enough.

As illustrated in the diagrams, a total of 12 cycles is used for a charging and pumping phase for one of the two charge pumps in the shared charge pump. The shared charge pump first enters the charging phase PH1 for four clock cycles. It is then determined which output voltage is needed to be provided using the external capacitor as feedback. According to the priority, a pumping phase for outputting the set output voltage is entered for a next four cycles. It is then determined whether said output voltage is sufficient, again according to the external capacitor feedback. If the output voltage is insufficient, as illustrated in FIGS. 9A and FIG. 9C, the shared charge pump remains in the pumping phase for another four cycles. If the output voltage is sufficient, as illustrated in FIG. 9B and FIG. 9D, the shared charge pump returns to the charging phase for another four cycles. In the next 12 cycles, determination as to a pumping phase for the other output voltage is made.

As PVT variations may affect a level of the output voltages, the shared charge pump can utilize a mapping table which plots values of generated output voltages with a temperature of the shared charge pump. The determined output voltages can then be calibrated by inputting a current temperature of the shared charge pump to the mapping table. Note that the mapping table is merely one embodiment for accurately determining a value of the generated output voltages, and any calibration method can achieve the objectives of the present invention.

The disclosed method and device can use a charge of an external capacitor of a shared charge pump to both determine which output voltage has priority and also to control a length of time of a pumping phase for each output voltage. This determination and the use of control logic and clamping mechanisms enables the charging and pumping phases to be dynamically switched to more correctly match the requirements of an external coupled device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A shared charge pump partly disposed on an integrated circuit (IC) for providing a first output voltage and a second output voltage to a coupled device, the shared charge pump comprising:
a plurality of switches coupled to a first input voltage and a second voltage, wherein the plurality of switches are individually opened and closed according to control logic; and
a capacitor disposed outside the IC for storing charge according to the first input voltage and the second input voltage during a first phase, discharging to generate the first output voltage during a second phase, and discharging to generate the second output voltage during a third phase;
wherein the shared charge pump enters the first phase, the second phase and the third phase via control of the plurality of switches, and a sequence of the phases can be dynamically switched according to a level of the first output voltage and a level of the second output voltage determined at the capacitor.

2. The shared charge pump of claim 1, wherein the level of the first output voltage is compared with a first threshold and a level of the second output voltage is compared with a second threshold, wherein the first threshold corresponds to a required voltage gate high value of an external coupled device, and the second threshold corresponds to a required voltage gate low value of the external coupled device.

3. The shared charge pump of claim 2, wherein a priority of the first output voltage and the second output voltage is determined according to whether a difference between the first output voltage and the first threshold is greater or less than a difference between the second output voltage and the second threshold, wherein when a difference between the first output voltage and the first threshold is greater than a difference between the second output voltage and the second threshold, the second output voltage has priority, and when a difference between the first output voltage and the first threshold is less than a difference between the second output voltage and the second threshold, the first output voltage has priority.

4. The shared charge pump of claim 1, further comprising:
a first clamping mechanism coupled to the first input voltage; and
a second clamping mechanism coupled to the second input voltage;
wherein when the shared charge pump enters the second phase for outputting the first output voltage, the second clamping mechanism selectively clamps the second input voltage, and when the shared charge pump enters the third phase for outputting the second output voltage, the first clamping mechanism selectively clamps the first input voltage.

5. The shared charge pump of claim 4, wherein when it is determined during the second phase that the first output voltage is insufficient, the first clamping mechanism operates to make the output of the first clamping mechanism equal to the first input voltage, and when it is determined during the third phase that the second output voltage is insufficient, the second clamping mechanism operates to make the output of the second clamping mechanism equal to the second input voltage.

6. The shared charge pump of claim 4, wherein during the first phase, the first clamping mechanism operates to make the output of the first clamping mechanism equal to the first input voltage, and the second clamping mechanism operates to make the output of the second clamping mechanism equal to the second input voltage.

7. The shared charge pump of claim 3, wherein for a first set number of consecutive clock cycles within a predetermined number of consecutive clock cycles, the shared charge pump enters the first phase.

8. The shared charge pump of claim 7, wherein after the first set number of consecutive clock cycles, the shared charge pump compares the level of the first output voltage with the first threshold and the level of the second output voltage with the second threshold.

9. The shared charge pump of claim 8, wherein when the first output voltage has priority, the shared charge pump uses the comparison between the first output voltage and the first threshold level to determine if the level of the first output voltage is sufficient, and when the second output voltage has priority, the shared charge pump uses the comparison between the second output voltage and the second threshold level to determine if the level of the second output voltage is sufficient.

10. The shared charge pump of claim 9, wherein when the first output voltage is sufficient, the shared charge pump enters the second phase for a second set number of consecutive clock cycles and then re-enters the first phase for the first set number of consecutive clock cycles, and when the first output voltage is not sufficient, the shared charge pump enters the second phase for a third set number of consecutive clock cycles being twice the second set number of consecutive clock cycles.

11. The shared charge pump of claim 9, wherein when the second output voltage is sufficient, the shared charge pump enters the third phase for a second set number of consecutive clock cycles and then re-enters the first phase for the first set number of consecutive clock cycles, and when the second output voltage is not sufficient, the shared charge pump enters the third phase for a third set number of consecutive clock cycles being twice the second set number of consecutive clock cycles.

12. The shared charge pump of claim 1, further comprising utilizing a mapping table to plot a temperature of the shared charge pump with a level of the first output voltage and a level of the second output voltage, wherein the level of the first output voltage and a level of the second output voltage determined at the capacitor are further calibrated by inputting a current temperature of the shared charge pump to the mapping table.

13. The shared charge pump of claim 1, wherein a length of each of the first phase, the second phase and the third phase is adjustable.

14. A method for generating a first output voltage and a second output voltage using a shared charge pump partly disposed on an integrated circuit (IC) and providing the first output voltage and the second output voltage to an external coupled device comprises:
    coupling a plurality of switches to a first input voltage and a second voltage;
    using control logic for individually opening and closing the plurality of switches;
    storing charge on a capacitor disposed outside the IC according to the first input voltage and the second input voltage during a first phase entered via the control logic;
    discharging the capacitor to generate the first output voltage during a second phase entered via the control logic; and
    discharging the capacitor to generate the second output voltage during a third phase entered via the control logic;
    wherein a sequence of the phases can be dynamically switched, and
    comprises:
    determining a level of the first output voltage and a level of the second output voltage at the capacitor.

15. The method of claim 14, wherein the step of determining a level of the first output voltage and a level of the second output voltage at the capacitor comprises:
    comparing a level of the first output voltage with a first threshold and a level; and
    comparing a level of the second output voltage is compared with a second threshold;
    wherein the first threshold corresponds to a required voltage gate high value of the external coupled device, and the second threshold corresponds to a required voltage gate low value of the external coupled device.

16. The method of claim 15, further comprising:
    determining a priority of the first output voltage and the second output voltage according to whether a difference between the first output voltage and the first threshold is greater or less than a difference between the second output voltage and the second threshold;
    wherein when a difference between the first output voltage and the first threshold is greater than a difference between the second output voltage and the second threshold, the second output voltage has priority, and when a difference between the first output voltage and the first threshold is less than a difference between the second output voltage and the second threshold, the first output voltage has priority.

17. The method of claim 14, wherein the step of discharging the capacitor to generate the first output voltage during a second phase entered via the control logic further comprises:
    selectively clamping the first input voltage;
    and the step of discharging the capacitor to generate the second output voltage during a third phase entered via the control logic further comprises:
    selectively clamping the second input voltage.

18. The method of claim 17, wherein the step of selectively clamping the first input voltage comprises:
    determining whether the first output voltage is insufficient; and
    when it is determined the first output voltage is insufficient, directly outputting the first input voltage to the capacitor;
    and the step of selectively clamping the second input voltage comprises:
    determining whether the second output voltage is insufficient; and
    when it is determined the second output voltage is insufficient, directly outputting the second input voltage to the capacitor.

19. The method of claim 14, wherein the step of storing charge on a capacitor disposed outside the IC according to the first input voltage and the second input voltage during a first phase entered via the control logic comprises:
    directly outputting the first input voltage and the second input voltage to the capacitor.

20. The method of claim 16, wherein the step of storing charge on a capacitor disposed outside the IC according to the first input voltage and the second input voltage during a first phase entered via the control logic is performed for a first set number of consecutive clock cycles within a predetermined number of consecutive clock cycles.

21. The method of claim 20, wherein the step of comparing the level of the first output voltage with the first threshold and the level of the second output voltage with the second threshold is performed after the first set number of consecutive clock cycles.

22. The method of claim 21, wherein when the first output voltage has priority, the method further comprises:
    utilizing the comparison between the first output voltage and the first threshold level to determine if the level of the first output voltage is sufficient;
    and when the second output voltage has priority, the method further comprises:
    utilizing the comparison between the second output voltage and the second threshold level to determine if the level of the second output voltage is sufficient.

23. The method of claim 22, wherein when the first output voltage is sufficient, the method comprises:
    entering the second phase for a second set number of consecutive clock cycles; and
    re-entering the first phase for the first set number of consecutive clock cycles;
    and when the first output voltage is not sufficient, the method comprises:
    entering the second phase for a third set number of consecutive clock cycles being twice the second set number of consecutive clock cycles.

24. The method of claim 22, wherein when the second output voltage is sufficient, the method comprises:
    entering the third phase for a second set number of consecutive clock cycles; and
    re-entering the first phase for the first set number of consecutive clock cycles;
    and when the second output voltage is not sufficient, the method comprises:
    entering the third phase for a third set number of consecutive clock cycles being twice the second set number of consecutive clock cycles.

25. The method of claim 14, further comprising:
    generating a mapping table comprising a temperature of the shared charge pump, a level of the first output voltage and a level of the second output voltage;
    and the step of determining a level of the first output voltage and a level of the second output voltage at the capacitor comprises:
    inputting a current temperature of the shared charge pump to the mapping table to calibrate the first output voltage and the second output voltage.

26. The method of claim 14, wherein a length of each of the first phase, the second phase and the third phase is adjustable.

* * * * *